Aug. 16, 1932.  T. F. RATAICZAK ET AL  1,872,004
FOOD HANDLING APPARATUS
Filed April 27, 1929  2 Sheets-Sheet 1

INVENTOR
Thomas F. Rataiczak
John C. Slager
BY Marechal and Noe
ATTORNEYS

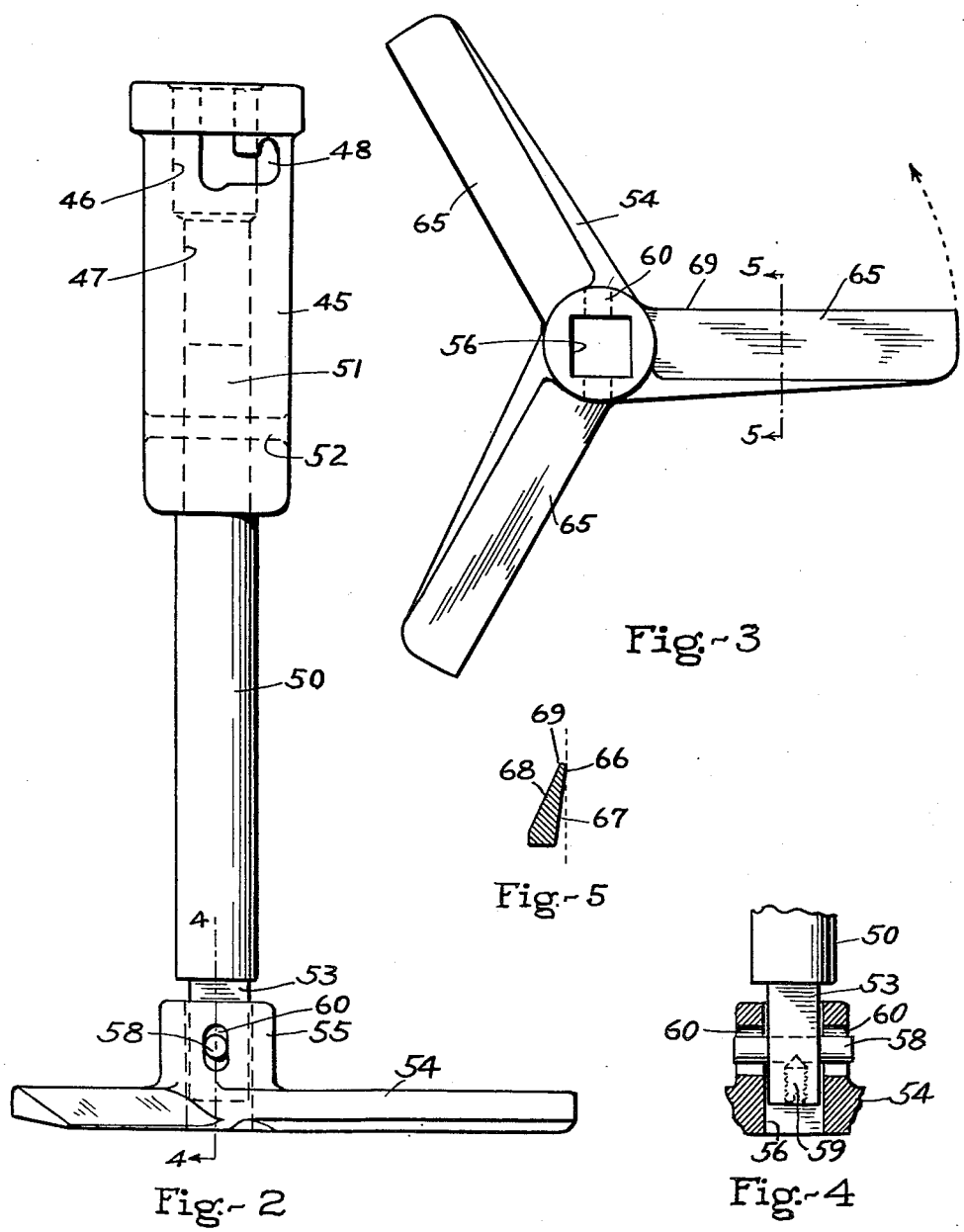

Patented Aug. 16, 1932                                                              1,872,004

UNITED STATES PATENT OFFICE

THOMAS F. RATAICZAK, OF TROY, AND JOHN C. SLAGER, OF DAYTON, OHIO, ASSIGNORS TO THE HOBART MANUFACTURING COMPANY, OF TROY, OHIO, A CORPORATION OF OHIO

FOOD HANDLING APPARATUS

Application filed April 27, 1929. Serial No. 358,530.

This invention relates to food handling apparatus, and more particularly to mixing machines such as candy mixers.

One of the principal objects of the invention is to provide an effectively operating mixing machine of this character capable of mixing and cooking ingredients, such as go to make up candy, in an efficient manner without burning.

Another object of the invention is to provide a scraper for the inner surface of the container of a mixing machine of this character which is simple and rugged in construction, effective in operation to secure proper mixing of the ingredients and to efficiently scrape off material tending to stick to the container, and constructed to permit movement of the scraper to adapt itself to irregularities of such inner surface of the container.

Other objects and advantages of the invention will be apparent from the following description and the accompanying drawings and appended claims.

In the drawings in which like characters of reference designate like parts throughout the several views thereof—

Fig. 2 is an enlarged side elevational view of the bottom scraper;

Fig. 3 is a plan of the scraper member when detached;

Fig. 4 is a vertical sectional view taken on the plane of the line 4—4 of Fig. 2; and Fig. 5 is a vertical sectional view on the plane of the line 5—5 of Fig. 3.

Figure 1:
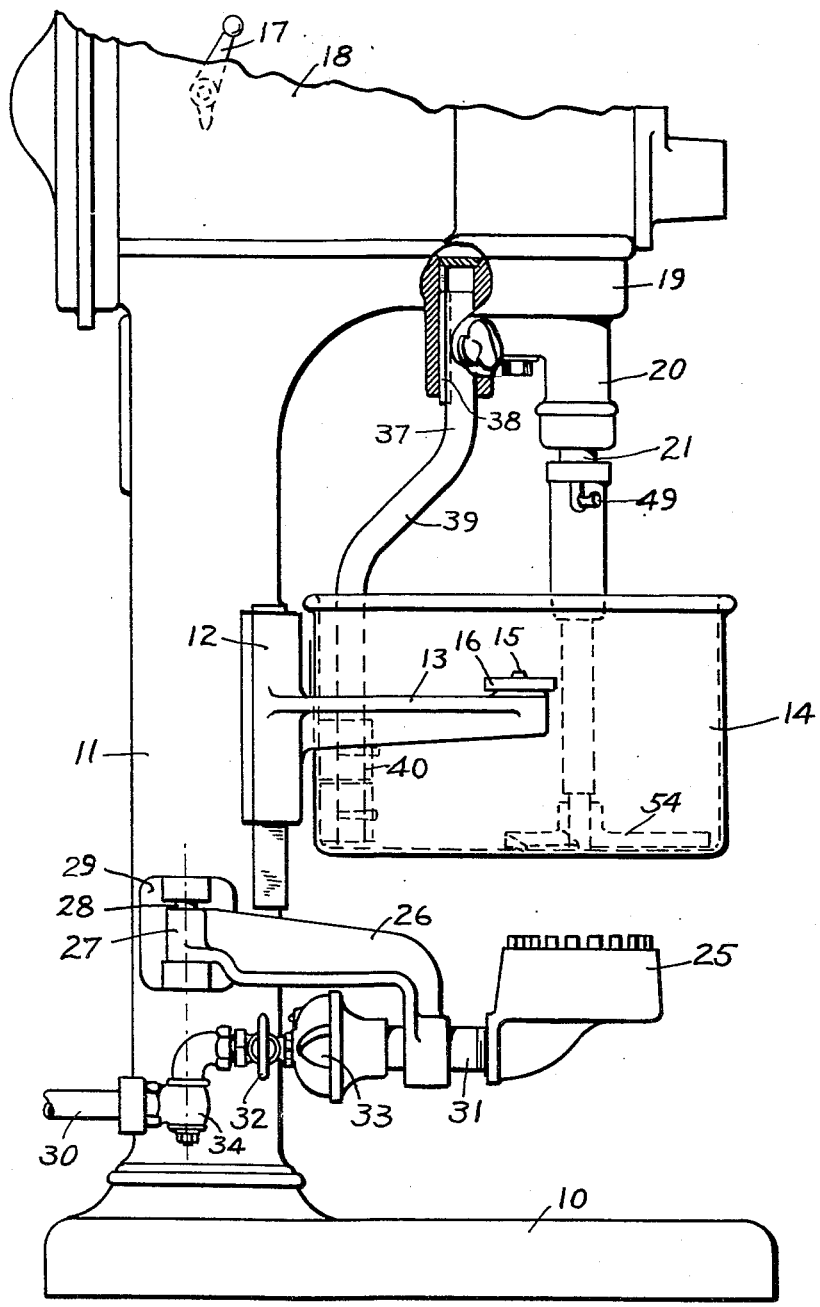
Fig. 1 is a partial side elevational view of a mixing machine constructed in accordance with this invention, parts being broken away and in section to better illustrate the construction thereof.

In the drawings is illustrated a preferred embodiment of the invention. The machine as shown in the drawings comprises a base 10 upon which is mounted a supporting pedestal 11 which holds the bowl support 12 having semi-circular arms 13 for carrying the bowl or container 14. Each arm 13 has an upstanding pin 15 which is received by and passes through an opening in an outstanding ear 16 carried by the bowl 14. At the upper part of the pedestal 11 is mounted a casing 18 enclosing suitable motor driven transmission mechanism (not shown) which serves to rotate the planetary head 19 at desired speeds. A control lever 17 is provided by means of which the operator is permitted to control the operation of the machine. As this transmission mechanism may be of any suitable conventional construction, the same is not illustrated herein. The planetary head 19 has a depending leg 20 within which is rotatably mounted a planetary shaft 21. The shaft 21 has a compound movement, rotating about its own axis and at the same time revolving about the axis of the planetary head 19, in a manner well known in the art.

The device of the present invention is particularly adapted for the stirring and mixing of the ingredients in candy making, during the cooking thereof. A burner 25 is supported beneath the bowl 14 by means of an arm 26 swiveled at 27 about a rod 28 mounted on a bracket 29 attached to the side of pedestal 11. Gas or other suitable fuel is supplied to the burner 25 through connected pipes 30 and 31 having a shut-off valve 32 and an air mixing valve 33. The pipes 30 and 31 are connected by a swiveled coupling 34, the vertical axis of which coincides with the longitudinal axis of the rod 28 forming a pivot for the arm 26. This construction permits the burner 25 supported by the arm 26 to be readily swung about the coupling 34 from under the bowl.

In order to secure adequate stirring and mixing of the ingredients during cooking, and to prevent sticking to the interior walls of the container 14 with resultant burning, there is provided a bottom scraper for the bottom wall of the bowl, and also a side scraper for the side wall thereof. The side scraper comprises a shaft 37 keyed to the planetary head 19 as indicated at 38. The shaft 37 as shown is mounted eccentrically with respect to the planetary head, and angularly spaced approximately 180° from the shaft 21 to prevent interference of one scraper with the movement of the other and to facilitate balancing of the rotating planetary head. The shaft 37 is bent outwardly as indicated at 39 and then downwardly adjacent the side wall of the container 14, and carries adjacent its lower end suitable scraper blades 40 which are inclined towards the side of the bowl in the direction of rotation of the planetary head 19; being shown as separable blades pinned to the shaft.

The bottom scraper is removably connected to the lower end of the planetary shaft 21 by means of a bayonet and slot connection. The rotation of the bottom scraper 54 on its own axis and its circular movement around the axis of the planetary head causes the bottom scraper to operate over substantially the entire surface of the flat bottom of the bowl. As shown more particularly in Figs. 2 to 5, the bottom scraper comprises a shank 45 having a two-diameter bore 46 and 47 therein adapted to receive the lower corresponding two-diameter end of the shaft 21, this construction facilitating the easy connection and disconnection of the scraper member and the shaft. The shank is provided with a bayonet slot 48 formed through the annular wall thereof and adapted to receive a pin 49 protruding from the lower end of the shaft 21 forming the bayonet and slot connection to lock the scraper to the shaft. For convenience in construction, the shank is made of two parts, a separate scraper stud 50 being provided with an end 51 of reduced diameter which is received within and firmly fastened by a cross pin 52 to the socket portion of the shank.

The stud 50 is provided with a flat sided reduced lower end 53 to receive the connecting hub 55 of the bottom scraper member. These parts have a loose fit, being constructed to permit the scraper member to readily adjust itself to distortions or other irregularities in the inner surface of the bottom wall of the container 14, such as are apt to be produced during cooking due to the heating of the bowl. Preferably the shaft 53 and the bore in the hub 55 are of polygonal shape so that the scraper member is constrained to rotate with the shank. A pin 58 is rigidly fastened by a screw 59 within the shaft end 53, the pin having outwardly extending ends which pass through diametrically opposed slots 60 formed in the wall of hub 55 to prevent the scraper member from dropping off of the supporting shaft. To permit free axial and wobbling movements of the scraper member, the slots 60 are elongated in the direction of the longitudinal axis of hub 55, and are of somewhat greater width than the diameter of the pin 58. The squared bore 56 is likewise of somewhat greater dimensions than the squared shaft 53 to provide a loose fit. The entire scraper member may thus slide axially of the reduced end 53, or the scraper member may wobble or tilt, whereby a "floating connection" between the actuating member and scraper member is provided.

In a large size candy mixing machine of this character provided with a large capacity container, the ratio of the surface area of the heretofore known scraper members relative to the surface area of the bottom of the container is relatively small. However, in a small size candy mixer, such as one provided with a five-quart to twenty-quart capacity bowl, the ratio of the exposed surface area of the conventional scraper to the surface area of the bottom of the bowl, or to the amount of batch being treated, is relatively large. With the heretofore known scraper members, masses of sticky candy tend to accumulate on the top surface of the scraper blade and about the scraper, particularly in machines having a planetary movement of the scraper, and in a small size machine of the order above mentioned, this accumulation may amount to a relatively large proportion of the batch, thereby resulting in imperfect mixing of the batch and increased load on the machine with larger power consumption. The present invention overcomes this objection and provides a scraper which is very satisfactorily adapted for small size candy mixers, although of general application to other sizes of such machines.

The scraper member comprises a plurality of angularly spaced outwardly extending integral scraper blades 65, shown as three in number and spaced 120° apart. Each scraper blade has a bearing surface 66 of small area adjacent its forward scraping portion, the bottom surface 67 being slightly inclined with respect to the bearing surface 66 to provide a small clearance angle as shown clearly in Fig. 5. The top surface 68 of the scraper blade is inclined at an angle to the bearing surface 66, this angle being sufficiently larger than the clearance angle to provide a blade of sufficient thickness and strength. The overall width of each blade is relatively small to provide substantially as small a top surface area of the blade as is feasible and still give sufficient strength and rigidity to the scraper blade to withstand the scraping action during operation. At the same time, the angular inclination of the top surface is so coordinated with the width of the blade as not to present a steep wall of metal of sufficient top surface area moving into the candy mass as to cause the objectionable accumulation of candy thereon, but instead the construction is such that the candy tends to slide over the inclined surface without sticking. Preferably the inclination of the top surface 68 with respect to the bearing surface 66 or rake angle is less than 45°. The number of blades 65 can be varied as desired, but preferably as many as three are provided to give stability to the scraper and to increase the effective scraping action to eliminate any possibility of burning without the necessity of running the machine at higher speeds.

The small size of the blade coupled with the slight inclination thereof gives the candy ingredients a gentle weaving and mixing action which is preferred in candy mixing to a more vigorous agitation. As a further precaution agains accumulations of masses of sticky candy about the scraper member, substantially the entire front edge 69 of each scraper blade 65 extending outwardly from the cylindrical hub 55 is a thin scraping edge. The blades of the scraper member are inclined in the direction of rotation of the shaft 21 about its own axis. Each of the scraper blades has an effective width where it joins the hub which is not greater than the exterior diameter of the hub, so that the entire blade extends out from the wall of the hub, and thus eliminates side wall area of the blade adjacent the hub with the formation of pockets where candy could accumulate. The cylindrical hub 55, extending vertically and rotating about its own axis, has little tendency to accumulate candy masses. The effective size and top surface area for the scraper blades such as to prevent objectionable accumulation of candy masses thereon may be determined for each size machine by tests.

As an example of a very satisfactory construction for a machine having a bowl capacity of twenty quarts, the scraper member may be formed with scraper blades of a length of about four and one-fourth inches and an effective width of substantially seven-eighths of an inch to one inch, having a rake angle of substantially 30° and a clearance angle of substantially 10°. This construction provides a blade of substantially three-eighths of an inch thickness at its rear edge, where a bearing surface of substantially one-eighth of an inch in width is allowed at the leading edge of the blade.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In apparatus of the character described, an actuating member having a shaft, a scraper member having a scraping blade connected to a hub provided with a bore loosely receiving said shaft, and a pin carried by one of said members and loosely fitting within a slot in the other of said members, to thereby connect said scraper member to said actuating member for movement therewith while permitting wobbling movements of the hub and scraping blade of the scraper member relative to the actuating member.

2. In apparatus of the character described, a rotary shaft, a scraper member having a hub provided with a bore loosely receiving said shaft, a pin carried by said shaft and projecting outwardly at opposite sides thereof, said hub having opposed elongated slots loosely receiving the projecting portions of the said pin, to thereby connect said scraper member to rotate with said shaft while permitting axial and wobbling movements of the scraper member relative to said shaft.

3. In apparatus of the character described, a container having a bottom surface, an actuating member having a depending shaft operating within said container, a scraper member having a hub and a plurality of outwardly extending comparatively flat scraper blades rigidly connected to said hub adjacent the bottom of said hub, said scraper blades being carried in scraping relation with the bottom surface of said container and extending away from said bottom surface only a small distance upwardly into the interior of the container so as to avoid undue contact with material adapted to be treated within said container, and a floating interconnection between said actuating member and said hub constructed to prevent said scraper member from disengaging from said actuating member and to provide for movement therewith, while permitting movement of said scraper member with said hub and rigidly connected scraper blades relative to said actuating member to adapt itself to irregularities of the inner surface of said container.

4. Apparatus of the character described adapted for the scraping of a wall of a container supplied with sticky ingredients such as candy, comprising a scraper member having rigidly connected thereto a blade with a small bearing surface at its forward edge, the under surface of said blade to the rear of said bearing surface being slightly inclined at a small clearance angle with respect to said bearing surface, and the upper surface of said blade being inclined at a steeper angle which is not more than 45° with respect to the bearing surface to provide a comparatively flat blade, said blade having a comparatively small width providing a small top surface area to prevent objectionable accumulation of sticky ingredients thereon.

5. A scraper of the character described adapted to be connected to an actuating member having projections thereon, comprising a cylindrical hub having an axial bore providing an annular wall about the said bore and adapted to receive said actuating member, an outwardly extending scraper blade rigidly carried by said hub adjacent the bottom thereof, said hub having diametrically opposed elongated slots through the annular wall thereof adapted to receive said projections on the actuating member.

6. In apparatus of the character described, an actuating shaft having a polygonal end, a scraper member having a hub provided with a bore of corresponding polygonal shape loosely receiving the polygonal end of said shaft, a pin carried by said polygonal end of the shaft and projecting outwardly at opposite sides thereof, said hub having opposed elongated slots loosely receiving the projecting portions of said pin to prevent said scraper member from disengaging from said shaft and to provide for movement therewith, while permitting axial and wobbling movements of said scraper member relative to said shaft.

7. Apparatus of the character described, comprising a shank having detachable connecting means adapted to detachably receive a driving member, a stud rigidly connected to said shank and having a receiving end, a scraper member having a loosely fitting shaft and socket interconnection with said receiving end of said stud, and means for fastening said scraper member on said stud constructed to permit axial and wobbling movements of said scraper member relative to said stud.

8. In apparatus of the character described, a movable actuating member including a shaft portion, a scraper member having a plurality of comparatively flat scraper blades rigidly connected with a hub portion, said hub portion having a socket loosely receiving said shaft portion, and means for interconnecting said scraper member with said actuating member having provisions to permit adjusting movement of said scraper member relative to said actuating member.

9. In mixing apparatus of the character described having a comparatively flat bottomed bowl and an actuating member driven by the mixing apparatus and having a shaft portion depending within said bowl; a scraper member having a hub portion with a socket loosely receiving said shaft portion, said scraper member having more than two comparatively flat scraping blades rigidly connected to said hub and extending outwardly from said hub in scraping engagement with the bottom of said bowl, said scraping blades extending away from the bottom surface of said bowl only a small distance into the interior of the bowl, each blade having a small top surface area and a small top surface angular inclination so as to prevent objectionable accumulation of matter thereon, and means for interconnecting said scraper member with said actuating member to be driven thereby, said interconnecting means having provisions to permit adjusting movement of the scraper member with hub and rigidly connected blades relative to said actuating member to permit the scraper member to adapt itself to irregularities of the bottom surface of said bowl.

10. In mixing apparatus of the character described, the combination with a supporting pedestal, a bowl mounted on said pedestal, and a burner for heating the contents of said bowl carried on said pedestal, of a scraper within said bowl, an actuating shaft for said scraper, said shaft and said scraper having cooperating telescoping parts, one of said parts being formed with elongated slots, a pin carried by the other of said parts and projecting loosely through said slots to thereby connect said scraper member to rotate with said shaft while permitting axial and wobbling movements of the scraper member relative to said shaft.

11. A scraper member of the character described adapted for scraping the surface of a container comprising a cylindrical hub having a smooth exterior surface, a plurality of angularly spaced integral scraper blades of approximately the same width at their inner end as the diameter of the hub and extending outwardly from the hub adjacent the bottom thereof, substantially the entire extent of the forward edge of each of said scraper blades from the hub outwardly being an effective scraping edge, the top and bottom surface of said blades being defined by two surfaces converging at an acute angle to minimize adherence and piling up of the material on said scraper blades.

In testimony whereof we hereto affix our signatures.

THOMAS F. RATAICZAK.
JOHN C. SLAGER.